C. D. C. BUUCK.
TOWING APPARATUS.
APPLICATION FILED JUNE 23, 1914.
1,157,674.
Patented Oct. 26, 1915.
2 SHEETS—SHEET 2.
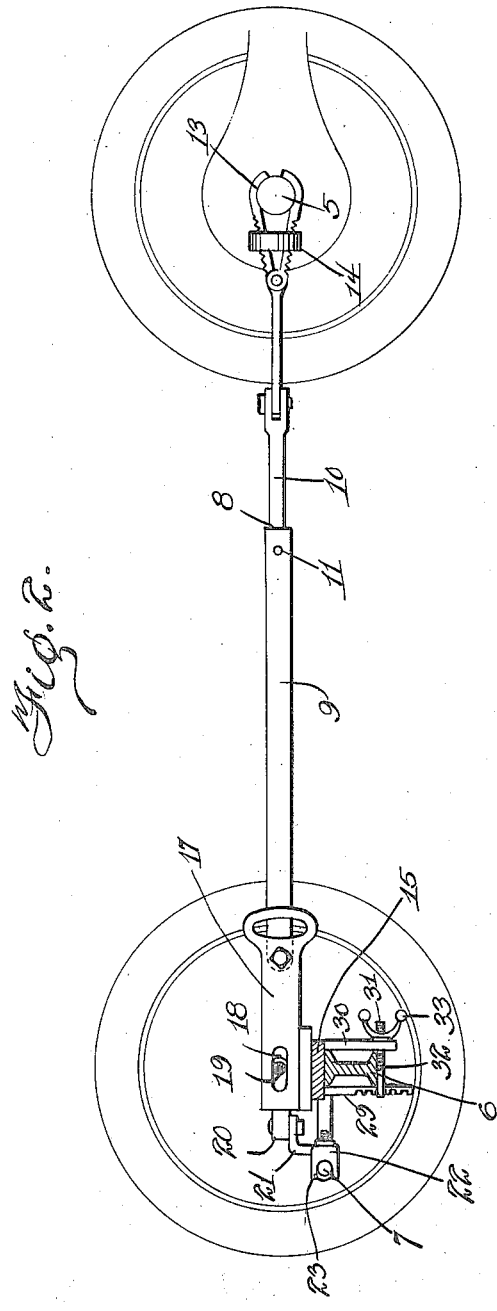
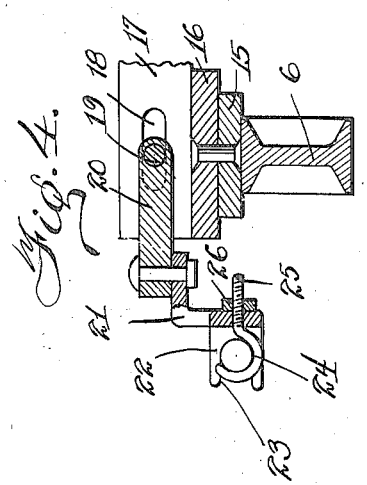
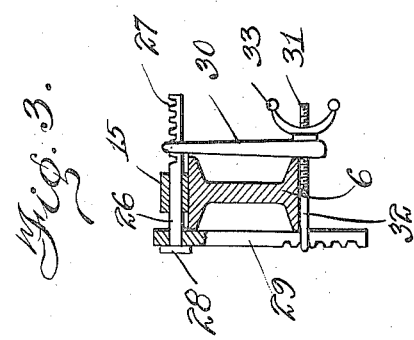

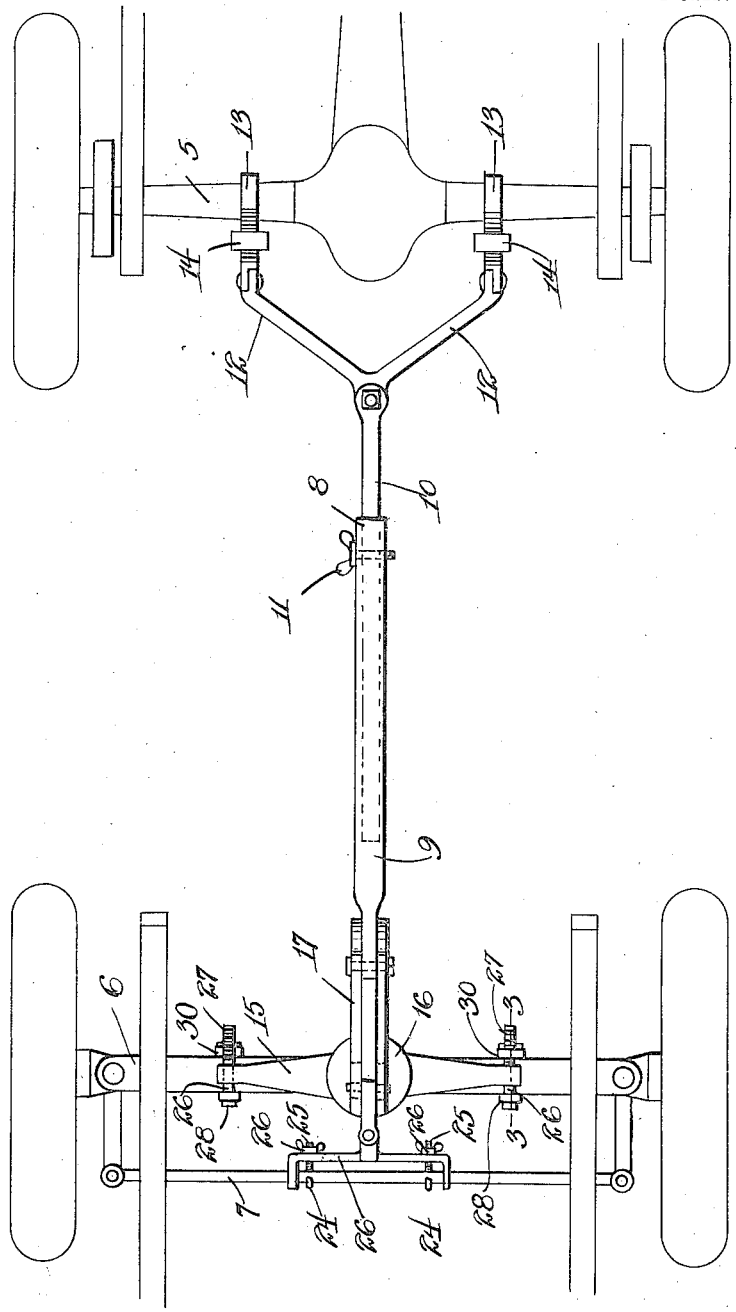

UNITED STATES PATENT OFFICE.

CHRISTIAN D. C. BUUCK, OF HOAGLAND, INDIANA.

TOWING APPARATUS.

1,157,674.  Specification of Letters Patent.  Patented Oct. 26, 1915.

Application filed June 23, 1914. Serial No. 846,863.

*To all whom it may concern:*

Be it known that I, CHRISTIAN D. C. BUUCK, a citizen of the United States, residing at Hoagland, in the county of Allen and State of Indiana, have invented certain new and useful Improvements in Towing Apparatus, of which the following is a specification.

This invention relates to towing apparatus for vehicles, especially motor vehicles and is designed as an improvement over my parent application, filed May 17, 1913, Serial No. 768,320, and has primarily for its object to provide an apparatus which is longitudinally adjustable to dispose the towing vehicle a predetermined distance apart from the incapacitated vehicle, at the option of the operator.

A further object of the invention is to so associate the towing mechanism with the steering rod of the incapacitated vehicle, that the latter will be guided in the path taken by the towing vehicle; the towing mechanism is constructed to permit of its expeditious attachment to or detachment from the steering rod.

A still further object of this invention is to provide a mechanism in conjunction with the reach which engages the front axle and steering rod of an incapacitated vehicle so as to guide the latter, the portion of the mechanism which is in engagement with the axle of the incapacitated vehicle, being adjustable laterally and longitudinally, so as to be adaptable for use in connection with axles of various types, and being readily detachable from the axle in view of its peculiar formation; the portion of the mechanism which is in connection with the steering rod being capable of attachment to steering rods of various circumferential dimensions and being capable of movement longitudinally of the vehicle so as to be adapted for use with steering rods which are placed various distances from the axles with which they are associated.

Other objects as well as the nature, characteristic features and scope of my invention will be more readily understood from the following description taken in connection with the accompanying drawings and pointed out in the claims forming a part of this specification.

Referring to the drawings: Figure 1 is a top plan view of a towing apparatus constructed in accordance with my invention, illustrating the application thereof, Fig. 2 is a longitudinal sectional view of the same, Fig. 3 is a sectional view taken on the line 3—3 of Fig. 1, and Fig. 4 is a detailed enlarged fragmentary sectional view of a portion of the steering apparatus, showing the manner in which it is mounted on the axle, and its connection with the steering rods thereof.

In the drawings wherein is illustrated the preferred embodiment of this invention, in order to illustrate the application thereof, the rear axle 5 of a towing vehicle is provided which is arranged in spaced relation to the front axle 6 of an incapacitated vehicle, the latter having associated therewith the usual steering rod 7.

My improved towing apparatus in the present instance is generally designated at 8 and comprises a tubular section 9 in which is slidably mounted a solid section 10, said sections being held together through the medium of a pin 11. The section 10 has pivotally connected with the outer terminals thereof, divergent arms 12, the free end of each of the latter being in pivotal engagement with jaws 13, the latter conforming to the contour of the axle 5 of the towing vehicle, and provided with shanks which are serrated and adapted for engagement with a collar 14, the latter holding the jaws 13 snugly in engagement with the axle 5, as advantageously illustrated in Fig. 2.

Mounted on the axle 6 is an elongated plate 15 which extends in parallelism with said axle 6 and has revolubly mounted thereon a disk 16, the upper face of the latter having a pair of parallel arms 17 extending therefrom, which are in pivotal connection with one end of the section 9 of the reach. Elongated alining slots 18 are formed in the arms 17 and are adapted for engagement with the opposite ends of a pin 19, the pin extending transversely through one end of a link 20. The link 20 is pivotally engaged to an offset portion 21, the latter extending from the upper marginal edge of a yoke member 22, the yoke member comprising a metallic strap, the opposite ends of which are turned at right angles to the body and into parallelism with each other. Said right angled ends are provided therein with substantially semicircular recesses 23 which engage with the steering rod 7, said rod being held in engagement with the recesses 23 through the medium of hooks 24, the latter having threaded shanks 25 extending therefrom which are engaged through complemental openings in the body of the yoke member 22, the threaded shank 25 being held from displacement in the yoke member 22 by nuts 26.

The opposite ends of the plate 15 are reduced as previously pointed out, and are provided adjacent their terminals with squared openings, through which are mounted bars 26, one end of each of which is provided with a rack 27, while the opposite end has mounted thereon a head 28, the inner face of the latter abutting with the shank of a rack bar 29, since each of the bars 26 are engaged through the upper end of the rack bar 29, as advantageously illustrated in Fig. 3. The rack bar 29 is in engagement with the axle 6 on one side of the latter, while a plate 30 is in engagement with the opposite side of the axle, the upper end of said plate being reduced and adapted for engagement with the teeth 27 of the bar 26, while the opposite end thereof is provided with a transverse opening through which is threaded the shank 31 of a plate 32, said shank and said plate being hingedly connected together, and the latter being reduced and engaged with the teeth of the rack bar 29. In order to hold the threaded shank 31 through the opening in the bottom of the plate 30, a nut 33 is provided which is engaged with said threaded shank exterior of the plate 30, so as to hold the latter snugly in engagement with the axle, it being seen that the threading of the nut 33 on the shank 31 causes the plate 32 to exert pressure on the rack bar 29, thereby causing the latter to be also snugly engaged with the axle 6.

It will be understood that the above description and accompanying drawings comprehend only the general and preferred embodiment of my invention and that various minor changes in details of construction, proportion and arrangement of parts may be made within the scope of the appended claims and without sacrificing any of the advantages of my invention.

Having thus fully described my invention, what I claim as new and desire to secure by Letters Patent is:

1. A towing apparatus including a reach, one end of which is adapted for engagement with the rear axle of a towing vehicle, mechanism associated with the opposite end of said reach for engagement with the front axle of an incapacitated vehicle, and means for holding said mechanism in engagement with said front axle, said means comprising bars associated with the mechanism and one side of the axle, plates adjustably connected to said bars, and means in connection with said plates for simultaneously actuating said bars and said plates to snugly engage the axle.

2. A towing apparatus including a reach adapted for engagement with the rear axle of a towing vehicle, a mechanism in connection with the opposite end for engagement with the front axle and the steering rod of an incapacitated vehicle, the steering rod engaging portion comprising a metal strap, the opposite ends of which are turned at right angles to the body and provided with recesses in their terminals adapted for the reception of the steering rod, and hooks mounted in said straps for preventing accidental displacement of said rod from said recesses.

In testimony whereof I affix my signature in presence of two witnesses.

CHRISTIAN D. C. BUUCK.

Witnesses:
CHARLES HOEFFMER,
FRANK H. OTTENWELLER.